United States Patent Office 3,027,366
Patented Mar. 27, 1962

3,027,366
21-HETEROCYCLICOXY-16α,17α-ALKYLIDENE-DIOXY PREGNENES AND PREGNADIENES
Joseph Francis Weidenheimer, New City, N.Y., and Lewis Joseph Leeson, Park Ridge, N.J., assignors to American Cyanamid Company, New York, N.Y., a corporation of Maine
No Drawing. Filed Dec. 8, 1958, Ser. No. 778,605
2 Claims. (Cl. 260—239.55)

This invention relates to new steroid compounds. More particularly, it relates to 21-tetrahydropyranyl, 21-tetrahydrofuranyl, 16α,21-ditetrahydropyranyl and 16α, 21-ditetrahydrofuranyl derivatives of steroids of the pregnane series.

We have found that these steroid ethers of the pregnane series having the following general formula have high anti-inflammatory activity:

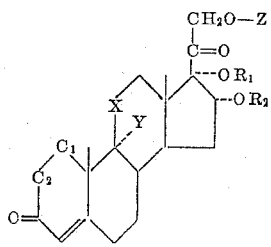

in which X is a divalent radical of the group consisting of —CHOH— and

radicals; Y is a member of the group consisting of hydrogen and a halogen atom; Z is a member of the group consisting of tetrahydropyranyl and tetrahydrofuranyl radicals; —$C_2$—$C_1$— is a divalent radical of the group consisting of —$CH_2$—$CH_2$— and —CH=CH—; $R_1$ is hydrogen; $R_2$ is a member of the group consisting of a tetrahydropyranyl radical and $OR_1$ and $OR_2$, when taken together, form a radical of the group consisting of methylenedioxy, lower alkylmethylenedioxy and dilower alkylmethylenedioxy radicals.

The compounds of the present invention are, in general, crystalline solids and insoluble in water. They are crystallizable from organic solvents such as ethyl acetate, acetone, ethyl alcohol, and the like, or mixtures of organic solvents such as ethyl acetate-benzene, acetone-benzene, or ethyl acetate-toluene.

The compounds of the present invention are prepared by reacting 21-hydroxylated or 16α,21-dihydroxylated steroids generally described in the literature such as J. Amer. Chem. Soc. 80, pages 2338–9 (1958), U.S. Patent 2,789,-118 and U.S. Patent 2,773,080 and having the following structure:

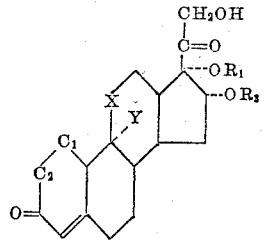

in which X, Y, —$C_1$—$C_2$— and $R_1$ are as defined above, $R_3$ is hydrogen and $OR_1$ and $OR_3$ when taken together form a radical of the group consisting of methylenedioxy, lower alkylmethylenedioxy and diloweralkylmethylenedioxy radicals with a dihydropyran or dihydrofuran in the presence of an acidic agent such as hydrochloric acid, phosphorous oxychloride, toluenesulfonic acid, and the like. The reaction is preferably carried out by adding the steroid to sufficient dihydropyran or dihydrofuran to effect solution after addition of an acidic agent and stirring. During the mixing, the reaction mixture may become warm. The reaction is usually carried out at a temperature within the range from about 25–90° C. Warming usually facilitates the reaction. The reaction ordinarily occurs within a period of from several minutes to several hours.

The compounds of the present invention are physiologically active, possessing glucocorticoid and anti-inflammatory activity. They can be used in the treatment of rheumatoid arthritis, burns, allergies, psoriasis, and other such disorders. The ethers and di-ethers of this invention are less soluble than the parent steroids and are thus suitable particularly in preparations designed for intra-articular therapy and similar modes of administration requiring a delayed action or depot response.

In the present application the term methylenedioxy refers to a divalent radical, both free valences of which are attached from the oxygen atoms to the 16 and 17 positions of the steroid nucleus, which oxygen atoms are attached to the same carbon atom, which in its turn, also has attached to it two hydrogen atoms, two lower alkyl radicals, or a hydrogen and a lower alkyl radical. The term lower alkyl radical refers to a monovalent alkyl radical having 1–6 carbon atoms. The term halogen covers bromine, chlorine, iodine, and fluorine. The temperatures are on the centrigrade scale unless otherwise indicated.

The following examples describe the present invention in greater particularity and are intended to be by way of illustration and not limitation.

EXAMPLE 1

Preparation of 9α - Fluoro - 16α,17α-Isopropylidenedioxy-11β - Hydroxy - 21 - (2 - Tetrahydropyranyloxy) - 1,4-Pregnadiene-3,20-Dione One-half gram of 9α-fluoro-16α,17α-isopropylidenedioxy-11β,21-dihydroxy-1,4-pregnadiene-3,20-dione is suspended in 20 ml. of 2,3-dihydropyran, and 1 ml. of concentrated hydrochloric acid is added. The mixture is stirred until it becomes clear. During the mixing, the vessel becomes warm. Petroleum ether is added to the solution until no further precipitation occurs. The precipitate is separated, washed with petroleum ether, and recrystallized from ethyl acetate, giving 200 mg. of white crystals.

EXAMPLE 2

Preparation of 9α - Fluoro - 11β,17α-Dihydroxy-16α,21-Di(2 - Tetrahydropyranyloxy) - 1,4 - Pregnadiene-3,20-Dione One gram of 9α-fluoro-11β,16α,17α,21-tetrahydroxy-1,4-pregnadiene-3,20-dione is suspended in 30 ml. of 2,3-dihydropyran, and 1 ml. of concentrated hydrochloric acid is added. The mixture is stirred for three to four hours during which time solution is effected, followed by precipitation. The precipitate is separate, and petroleum ether is added to the filtrate until no further precipitation occurs. The second precipitate is separated, and the two precipitates are washed with petroleum ether, combined, and recrystallized from ethyl acetate. A total of 400 mg. of white crystalline product is thus recovered.

EXAMPLE 3

Preparation of 9α - Fluoro - 16α,17α-Isopropylidenedioxy-11β - Hydroxy - 21 - (2-Tetrahydropyranyloxy)-4-Pregnene-3,20-Dione Five hundred mg. of 9α-fluoro-16α,17α-isopropylidenedioxy-11β,21-dihydroxy-4-pregnene-3,20-dione is suspended in 20 ml. of 2,3-dihydropyran, and 1 ml. of concentrated hydrochloric acid is added. The mixture is stirred until it becomes clear. During the mixing the vessel becomes warm. Petroleum ether (Skellysolve B) is added to the solution until no further precipitation occurs and the resulting solid product is washed with petroleum ether and recrystallized from ethyl acetate. Approximately 200 mg. of white crystalline product is recovered.

EXAMPLE 4

*Preparation of 9α - Fluoro-11β,17α - Dihydroxy - 16α,21- Di(2-Tetrahydropyranyloxy)-4-Pregnene-3,20-Dione*

One gram of 9α-fluoro-11β,16α,17α,21-tetrahydroxy-4-pregnene-3,20-dione is suspended in 30 ml. of 2,3-dihydropyran, and 1 ml. of concentrated hydrochloric acid is added. The mixture is stirred for three to four hours, during which time solution is effected, followed by precipitation. The precipitate is removed, and further precipitation is caused by addition of petroleum ether to the filtrate. The two precipitates are separately washed with petroleum ether, and then the two washed precipitates are combined and recrystallized from ethyl acetate. Approximately 400 mg. of white crystalline product is recovered.

EXAMPLE 5

*Preparation of 9α-Fluoro-16α,17α-Isopropylidenedioxy-21- (2 - Tetrahydropyranyloxy) - 1,4 - Pregnadiene-3,11,20- Trione*

Five hundred milligrams of 9α-fluoro-16α,17α-isopropylidenedioxy - 1,4-pregnadiene-3,11,20-trione is suspended in 20 ml. of 2,3-dihydropyran, and 1 ml. of concentrated hydrochloric acid is added. The mixture is stirred until it becomes clear. During the mixing the vessel becomes warm. Petroleum ether (Skellysolve B) is added to the solution until there is no further precipitation. The crude product is washed with petroleum ether and recrystallized from ethyl acetate.

EXAMPLE 6

*Preparation of 9α-Chloro-16α,17α-Isopropylenedioxy-11β-Hydroxy - 21 - (2-Tetrahydropyranyloxy)-1,4-Pregnadiene-3,20-Dione*

Five hundred milligrams of 9α-chloro-16α,17α-isopropylidenedioxy - 11β,21 - dihydroxy - 1,4 - pregnadiene-3,20-dione is suspended in 20 ml. of 2,3-dihydropyran, and 1 ml. of concentrated hydrochloric acid is added. The mixture is stirred until it becomes clear, during which time the reaction mixture becomes warm. Petroleum ether is added to the solution until no further precipitation occurs. The precipitate is collected, washed with petroleum ether, and recrystallized from ethyl acetate. Approximately 200 mg. of white crystalline product is recovered.

EXAMPLE 7

*Preparation of 9α - Bromo - 11β,17α - Dihydroxy-16α,21- Di(2 - Tetrahydropyranyloxy) - 1,4 - Pregnadiene-3,20- Dione*

One gram of 9α-bromo-11β,16α,17α,21-tetrahydroxy-1,4-pregnadiene-3,20-dione is added to 30 ml. of 2,3-dihydropyran, and 1 ml. of concentrated hydrochloric acid is added. The mixture is stirred for three to four hours, after which time a precipitate has formed. The precipitate is removed, and further precipitation is caused by addition of petroleum ether. The precipitates are washed with petroleum ether, combined, and recrystallized from ethyl acetate. A white crystalline product is recovered.

EXAMPLE 8

*Preparation of 11β-Hydroxy-16α,17α-Isopropylidenedioxy-21-(2-Tetrahydropyranloxy)-4-Pregnene-3,20-Dione*

One-half gram of 16α,17α-isopropylidenedioxy-11β,21-dihydroxy-4-pregnene-3,20-dione is added to 20 ml. of 2,3-dihydropyran, and 1 ml. of concentrated hydrochloric acid is added. The mixture is stirred until, with warming, it becomes clear. Petroleum ether is added until no further precipitation occurs. The precipitate is washed with petroleum ether and recrystallized from ethyl acetate, giving a white crystalline product.

EXAMPLE 9

*Preparation of 9α - Fluoro - 11β - Hydroxy - 16α,17α-Isobutylidenedioxy - 21 - (2 - Tetrahydropyranyloxy)-1,4- Pregnadiene-3,20-Dione*

One-half gram of 9α-fluoro-16α,17α-isobutylidenedioxy-11β,21 - dihydroxy - 1,4-pregnadiene-3,20-dione is mixed with 20 ml. of 2,3-dihydropyran, and 1 ml. of concentrated hydrochloric acid is added. The mixture is stirred until, with warming, it becomes clear. Petroleum ether is added until no further precipitation occurs. The precipitate is separated, washed with petroleum ether, and recrystallized from ethyl acetate, the yield being a white crystalline solid.

EXAMPLE 10

*Preparation of 9α - Fluoro - 11β-Hydroxy-16α,17α-Ethylidenedioxy - 21 - (2 - Tetrahydropyranyloxy)-1,4-Pregnadiene-3,20-Dione*

One-half gram of 9α-fluoro-16α,17α-ethylidenedioxy-11β,21 - dihydroxy - 1,4-pregnadiene-3,20-dione is mixed with 20 ml. of 2,3-dihydropyran, and 1 ml. of concentrated hydrochloric acid is added. The mixture is stirred until, with warming, it becomes clear. Petroleum ether is added until no further precipitation occurs. The precipitate is separated, washed with petroleum ether, and recrystallized from ethyl acetate. The product is a white crystalline solid.

EXAMPLE 11

*Preparation of 9α - Fluoro - 11β - Hydroxy-16α,17α-Isopropylidenedioxy - 21 - (2-Tetrahydrofuranyloxy)-1,4- Pregnadiene-3,20-Dione*

One-half gram of 9α-fluoro-16α,17α-isopropylidenedioxy-11β,21-dihydroxy-1,4-pregnadiene-3,20-dione is mixed with 20 ml. of 2,3-dihydrofuran and 1 ml. of concentrated hydrochloric acid is added. The mixture is stirred until, with warming, it becomes clear. Petroleum ether is added until no further precipitation occurs. The precipitate is separated, washed with petroleum ether and recrystallized from ethyl acetate. The product is a white crystalline solid.

We claim:
1. Compounds having the general formula

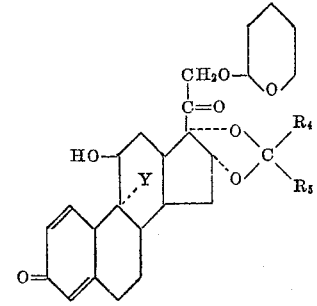

in which Y is halogen and $R_4$ and $R_5$ are lower alkyl radicals.

2. The compound 9α-fluoro-16α,17α-isopropylidenedioxy - 11β-hydroxy-21-(2-tetrahydropyranyloxy)-1,4-pregnadiene-3,20 dione.

(References on following page)

References Cited in the file of this patent

UNITED STATES PATENTS

| | | |
|---|---|---|
| 2,773,080 | Bernstein et al. | Dec. 4, 1956 |
| 2,777,864 | Bernstein et al. | Jan. 15, 1957 |
| 2,782,211 | Wettstein et al. | Feb. 19, 1957 |
| 2,789,118 | Bernstein et al. | Apr. 16, 1957 |
| 2,855,410 | Fried et al. | Oct. 7, 1958 |
| 2,875,200 | Hogg et al. | Feb. 24, 1959 |
| 2,879,279 | Burg | Mar. 24, 1959 |
| 2,880,204 | Fonken et al. | Mar. 31, 1959 |

OTHER REFERENCES

Fried et al.: J.A.C.S., vol. 80, pages 2338–9 (May 5, 1958).